UNITED STATES PATENT OFFICE.

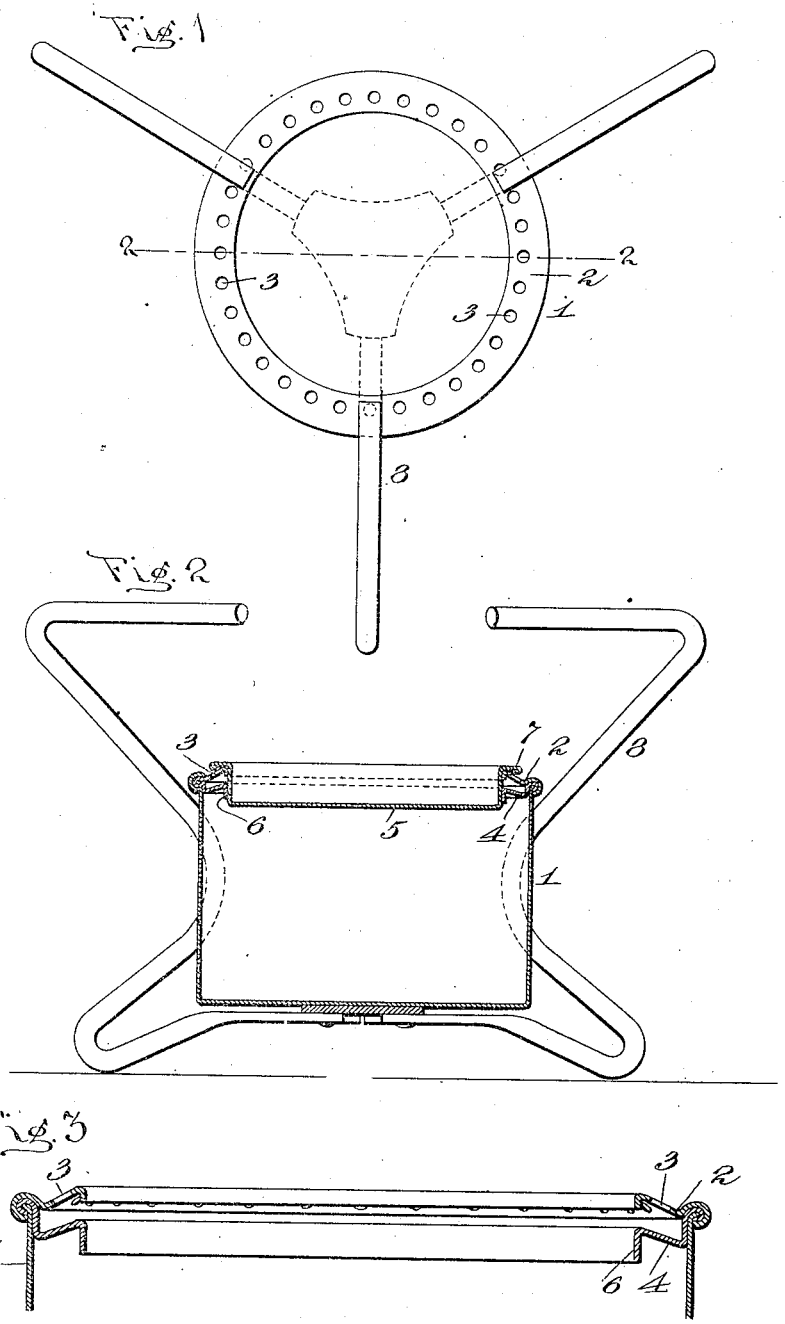

ALEXANDER STROBL, OF NEW YORK, N. Y., ASSIGNOR TO S. STERNAU & COMPANY, OF BROOKLYN, NEW YORK, A COPARTNERSHIP COMPOSED OF SIGMUND STERNAU AND LIONEL STRASSBURGER.

LAMP.

1,096,069.  Specification of Letters Patent.  Patented May 12, 1914.

Application filed February 19, 1914. Serial No. 819,672.

*To all whom it may concern:*

Be it known that I, ALEXANDER STROBL, a subject of the King of Hungary, and a resident of the borough of Manhattan, city, county, and State of New York, have invented a certain new and useful Lamp, of which the following is a specification.

This invention relates to lamps particularly intended to burn a non-liquid fuel.

The object I have in view is to produce a lamp of this character, in which the body of the lamp, with the cover, will constitute a container for the fuel, and in which it may be shipped without loss by evaporation, but so designed that the lamp, when in use, will produce a hot flame.

These and further objects will more fully appear from the following specification and accompanying drawings.

In the drawings, Figure 1 is a plan view of a lamp embodying my invention, shown in connection with a supporting stand and with the cover removed. Fig. 2 is a sectional view on the line 2—2 of Fig. 1, showing the cover in position; and Fig. 3 is a sectional view on a larger scale of the upper part of the body showing the details of arrangement of the two rims.

In carrying out the invention, I first provide a body or container 1. This container is preferably of cylindrical shape, although not necessarily so, and is best made of sheet metal. At the upper edge of the body is a rim 2. This rim is provided with a plurality of orifices 3, for admitting air to the interior of the body, when the lamp is in use, thereby producing a bunsen effect. Below the rim 2 is a second rim 4. In connection with these two rims, is a cover 5. This cover has a part which engages with the rim 4, and makes an air-tight joint when it is in place. In order to increase the amount of contacting surface between the cover and the rim 4, and thereby reduce the liability of leakage, and at the same time hold the cover more firmly in place, the rim 4 is provided with a flange 6, which in the embodiment chosen for illustration, depends downward. In order to prevent the cover from being inserted too far, it is provided with an upper flange 7, this flange resting upon the rim 2. This flange 7 is useful to permit the introduction of a suitable tool for removing the cover. To assist in this operation, the rim 2 is dished outwardly toward the center, as shown in Fig. 3, thus producing a space between the rim and the flange 7. In order to define the annular space between the two rims, so as to properly divert the currents of air entering the lamp through the orifices, the rim 4 is also dished in the same manner as the rim 2. The inner edge of the rim 2 may be flanged, as shown in Fig. 3, to form a better bearing for the cover when it is in place, and also to direct the currents of air. The two rims 2 and 4 are shown as attached to the body 1 by being rolled over, as shown in Fig. 3. The lamp may be mounted on a suitable stand, such as 8, which holds it above the table or other support, and also provides an arrangement for carrying the utensil to be heated.

In use, the body 1 is filled with a suitable non-liquid fuel. I find a suitable fuel for this purpose may be what is known in the trade as "solid alcohol". This fuel, when ignited with a match, will burn with a hot flame, combustion being assisted by the entering of air through the orifices 3. When the lamp is not in use, the cover is introduced in place, and makes a tight joint with the flange 6, so that evaporation of the alcohol is arrested.

The lamp is very cheap to construct, and in fact, costs but slightly more than does a mere container for the fuel. While I have illustrated the body 1 as cylindrical, I desire to have it understood that the shape forms no feature of the invention, and it may, therefore, be departed from, as desired.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:—

1. A lamp comprising a body having a rim at the upper edge thereof, said rim containing air admitting orifices, a second rim below the first, and a cover having a part which engages with the second rim and thus closes the body.

2. A lamp comprising a body having a rim at the upper edge thereof, said rim containing air admitting orifices, a second rim below the first and having an internal flange, in combination with a cover having a flange engaging with the first rim and a part which engages with the internal flange of the second rim and thereby closes the body.

This specification signed and witnessed this sixth day of February, 1914.

ALEXANDER STROBL.

Witnesses:
ANNA E. RENTON,
HARRY PFOSTE.